(12) United States Patent
Richardson et al.

(10) Patent No.: US 7,054,915 B2
(45) Date of Patent: May 30, 2006

(54) REMOTE SERVICES CONTROL IN AN ATM/DSL SERVICE NETWORK

(75) Inventors: John William Richardson, Hamilton, NJ (US); Kumar Ramaswamy, Plainsboro, NJ (US)

(73) Assignee: Thomas Licensing, Boulogne-Billancourt (FR)

( * ) Notice: Subject to any disclaimer, the term of this patent is extended or adjusted under 35 U.S.C. 154(b) by 823 days.

(21) Appl. No.: 09/893,912

(22) Filed: Jun. 28, 2001

(65) Prior Publication Data

US 2002/0147833 A1    Oct. 10, 2002

(30) Foreign Application Priority Data

Apr. 7, 2001 (DE) ............................. 100 32 650

(51) Int. Cl.
*G06F 15/16* (2006.01)
*H04L 12/56* (2006.01)

(52) U.S. Cl. .............................. 709/217; 370/395.52
(58) Field of Classification Search ............... 709/224, 709/249, 217, 219; 370/395.52
See application file for complete search history.

(56) References Cited

U.S. PATENT DOCUMENTS

| | | | | |
|---|---|---|---|---|
| 5,592,470 | A * | 1/1997 | Rudrapatna et al. | 370/320 |
| 6,049,531 | A * | 4/2000 | Roy | 370/395.53 |
| 6,049,831 | A * | 4/2000 | Gardell et al. | 709/236 |
| 6,169,542 | B1 * | 1/2001 | Hooks et al. | 715/719 |
| 6,345,307 | B1 * | 2/2002 | Booth | 709/247 |
| 6,678,740 | B1 * | 1/2004 | Rakib et al. | 709/247 |
| 6,714,545 | B1 * | 3/2004 | Hugenberg et al. | 370/395.1 |
| 2001/0030977 | A1 * | 10/2001 | May | 370/475 |
| 2002/0071391 | A1 * | 6/2002 | Ishioka | 370/238 |
| 2002/0108119 | A1 * | 8/2002 | Mao et al. | 725/109 |
| 2002/0133828 | A1 * | 9/2002 | Foster | 725/110 |
| 2002/0165953 | A1 * | 11/2002 | Diong | 709/224 |
| 2002/0168054 | A1 * | 11/2002 | Klos et al. | 379/1.04 |
| 2002/0188952 | A1 * | 12/2002 | Istvan et al. | 725/95 |
| 2003/0004961 | A1 * | 1/2003 | Slothouber et al. | 707/100 |
| 2003/0030652 | A1 * | 2/2003 | Billmaier et al. | 345/629 |
| 2004/0071216 | A1 * | 4/2004 | Richardson et al. | 375/240.21 |

OTHER PUBLICATIONS

Kuchinsky, "Bit Velocity is not Enough: Content and Service Issues for Broadband Residential Information Service", IEEE, 199 pp. 49-54.*
Park et al., "An Effcient Group Communication Architecture over ATM Networks", IEEE, 1998, pp. 130-141.*

* cited by examiner (Continued)

*Primary Examiner*—Jeffrey Pwu
*Assistant Examiner*—J. Bret Dennison
(74) *Attorney, Agent, or Firm*—Joseph J. Laks; Robert B. Levy; Joseph J. Kolodka

(57) ABSTRACT

There is provided a method for remote services control in an Asynchronous Transfer Mode (ATM)/Digital Subscriber Line (DSL) service network. The ATM/DSL service network includes an ATM/DSL head-end system (NCS) and Customer Premise Equipment (CPE). The ATM/DSL head-end system includes a network control system (NCS). The CPE includes at least one computer. The method includes the step of sending an Internet Protocol (IP) encapsulated signal from the at least one computer, in response to an execution of a user command for the remote services control on the at least one computer. The IP encapsulated signal includes an IP address of a Hypertext Transfer Protocol (HTTP) web server that is coupled to the NCS. The IP encapsulated signal is received for processing by the HTTP server. The user command is communicated to the NCS, by the HTTP web server.

15 Claims, 4 Drawing Sheets

REMOTE SERVICES CONTROL IN AN ATM/DSL SERVICE NETWORK

TECHNICAL FIELD

The present invention relates generally to communication networks and, in particular, to remote services control in an Asynchronous Transfer Mode (ATM)/Digital Subscriber Line (DSL) service network.

BACKGROUND DESCRIPTION

FIG. 1 is a diagram of an exemplary system architecture for integrating voice, data, and video services, according to the prior art. Details of the individual block components making up the system architecture are known to skilled artisans, and will only be described in details sufficient for an understanding of the invention. The system block diagram 30 is composed of several functional blocks. A system domain 1 is composed of Central Office (CO) Equipment domain 100 and Customer Premise Equipment (CPE) domain 20. The component blocks within the system domain and their respective interfaces are: a customer premise equipment (CPE) unit 2, a digital subscriber line access multiplexer (DSLAM) 9, an ATM switch 10, an IP router 13, a ATM terminator 12, and a network control system (NCS) 11.

The customer premise equipment (CPE) unit 2 includes a DSL modem unit (also referred to by reference numeral 2) that interfaces with the DSLAM over a plain old telephone service (POTS), four separate analog SLIC interfaces to connect to analog telephones 3–6, 10Base-T Ethernet connection to a PC desktop system 7, and an Ethernet or RS-422 connection to a set-top box with a decoder 8 for connection to a television or video display 8'. The CPE unit 2 allows for the aggregation of telephone, computer, digital A/V stream, and command ATM data onto an ADSL line between the CPE unit 2 and the network system equipment. From the customer's point of view, the DSLAM 9 demodulates data from multiple DSL modems and concentrates the data onto the ATM backbone network for connection to the rest of the network. The DSLAM 9 provides back-haul services by providing concentration of the DSL lines onto ATM outputs to the ATM switch 10.

The ATM switch 10 is the backbone of the ATM network. The ATM switch 10 performs various functions in the network, including cell transport, multiplexing and concentration, traffic control and ATM-layer management. Of particular interest in the system domain 100, the ATM switch provides for the cell routing and buffering in connection to the DSLAM, the network control system 11 and the Internet gateway (Internet Protocol IP router 13 and ATM terminator 12), and T1 circuit emulation support in connection with the multiple telephony links switch 15. A T1 circuit provides 24 voice channels packed into a 193 bit frame transmitted at 8000 frames per second. The total bit rate is 1.544 Mbps. The unframed version, or payload, consists of 192 bit frames for a total rate of 1.536 Mbps.

The ATM switch 10 is shown coupled to a program guide server/video server 16 to satellite 17, radio broadcast 18 or cable 19 networks. The ATM switch is also coupled over the ATM terminator 12 and IP router 13 pair to receive Internet Protocol IP packet data from the Internet 14.

The network control system 100 provides for address translation, demand assignment and call management functions. The network control system's principal function is to manage the DSL/ATM network including the origination and termination of phone calls. The NCS is essential to the control entity communication and translating control information between the class 5 PSTN switch (using the GR-303 protocol) and the CPE unit 2. The network control system 100 is available for other functions, such as downloadable code to the CPE and bandwidth and call management (e.g., busy) functions as well as other service provisioning and set up tasks. The NCS also sets up the connections within the CO equipment to route video from the video server to the various CPE units connected to the DSLAM.

However, there is still a need for a method by which a CPE can securely communicate with the ATM/DSL head-end network control system (NCS) 11. Such a method would allow a customer to access and control certain options and to configure their services.

SUMMARY OF THE INVENTION

The problems stated above, as well as other related problems of the prior art, are solved by the present invention, a method for remote services control in an Asynchronous Transfer Mode (ATM)/Digital Subscriber Line (DSL) service network.

According to an aspect of the present invention, there is provided a method for remote services control in an Asynchronous Transfer Mode (ATM)/Digital Subscriber Line (DSL) service network. The ATM/DSL service network includes an ATM/DSL head-end system (NCS) and Customer Premise Equipment (CPE). The ATM/DSL head-end system includes a network control system (NCS). The CPE includes at least one computer. The method includes the step of sending an Internet Protocol (IP) encapsulated signal from the at least one computer, in response to an execution of a user command for the remote services control on the at least one computer. The IP encapsulated signal includes an IP address of a Hypertext Transfer Protocol (HTTP) web server that is coupled to the NCS. The IP encapsulated signal is received for processing by the HTTP server. The user command is communicated to the NCS, by the HTTP web server.

These and other aspects, features and advantages of the present invention will become apparent from the following detailed description of preferred embodiments, which is to be read in connection with the accompanying drawings.

DETAILED DESCRIPTION OF PREFERRED EMBODIMENTS

It is to be understood that the present invention may be implemented in various forms of hardware, software, firmware, special purpose processors, or a combination thereof. Preferably, the present invention is implemented as a combination of both hardware and software, the software being an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and microinstruction code. The various processes and functions described herein may either be part of the microinstruction code or part of the application program (or a combination thereof) which is executed via the operating system. In addition, various other peripheral devices may be connected to the computer platform such as an additional data storage device.

It is to be further understood that, because some of the constituent system components depicted in the accompanying Figures may be implemented in software, the actual connections between the system components may differ depending upon the manner in which the present invention is programmed. Given the teachings herein, one of ordinary skill in the related art will be able to contemplate these and similar implementations or configurations of the present invention.

A general description of the present invention will now be provided to introduce the reader to the concepts of the invention. Subsequently, more detailed descriptions of various aspects of the invention will be provided with respect to FIGS. 2 through 4.

The present invention allows a customer to securely communicate with the ATM/DSL head-end network control system (NCS) to subscribe to services and/or modify existing service parameters (e.g., set parental control parameters, view caller-ID records, voice mail, and so forth). The communication is accomplished through the existing DSL modem Internet Protocol (IP) data port (e.g., Ethernet, USB interface) on their computer using a web browser interface. An HTTP server can be located at the back-end of the ATM/DSL network for interfacing with the network control system (NCS). The customer can securely access the HTTP server to modify user-configurable options. The HTTP server can contain an application that the DSL customer can log into securely using a password or through the use of their unique CPE serial number identity.

Figure 1:
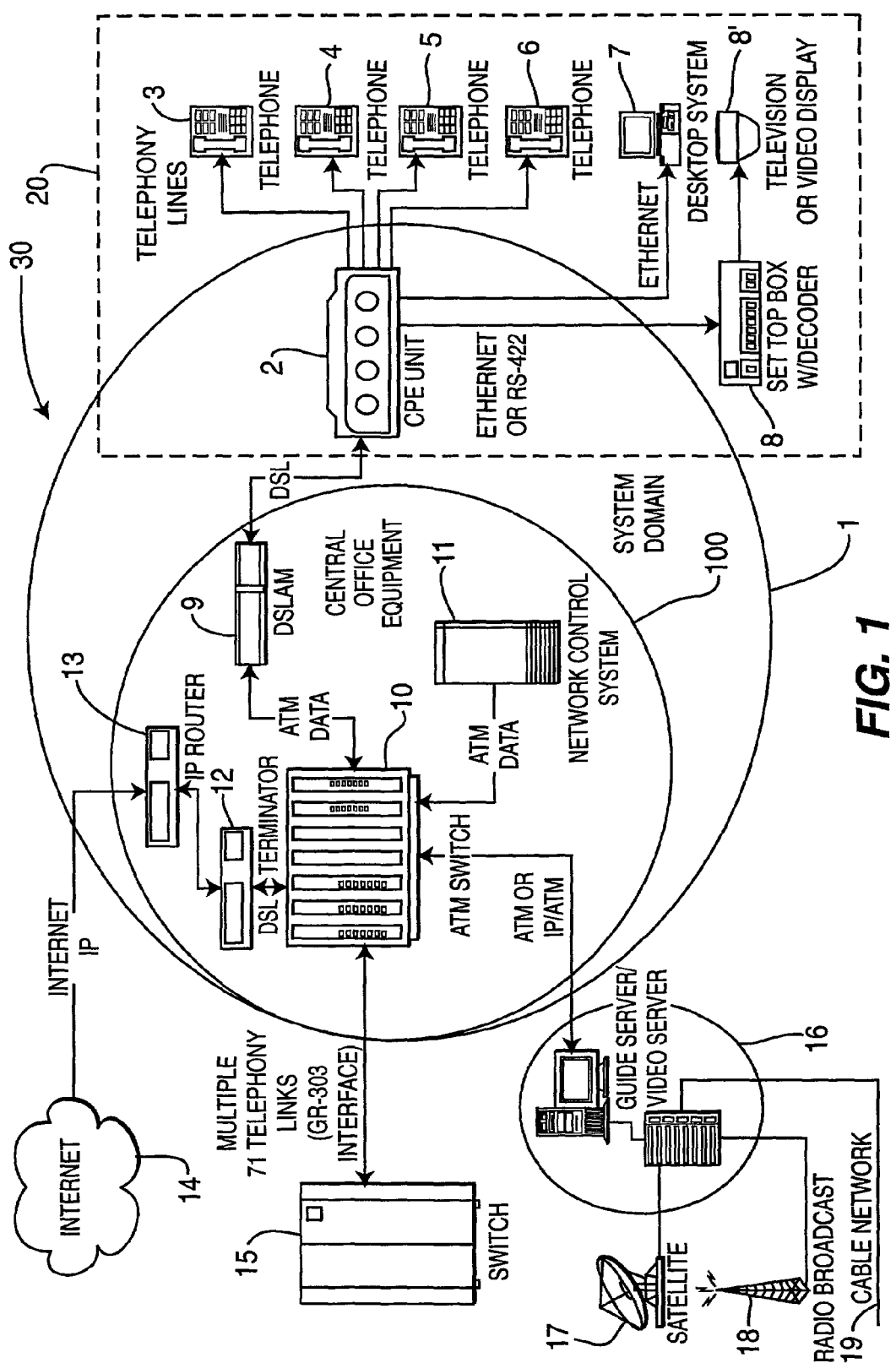
FIG. 1 is a diagram of an exemplary system architecture for integrating voice, data, and video services, according to the prior art.
Figure 2:
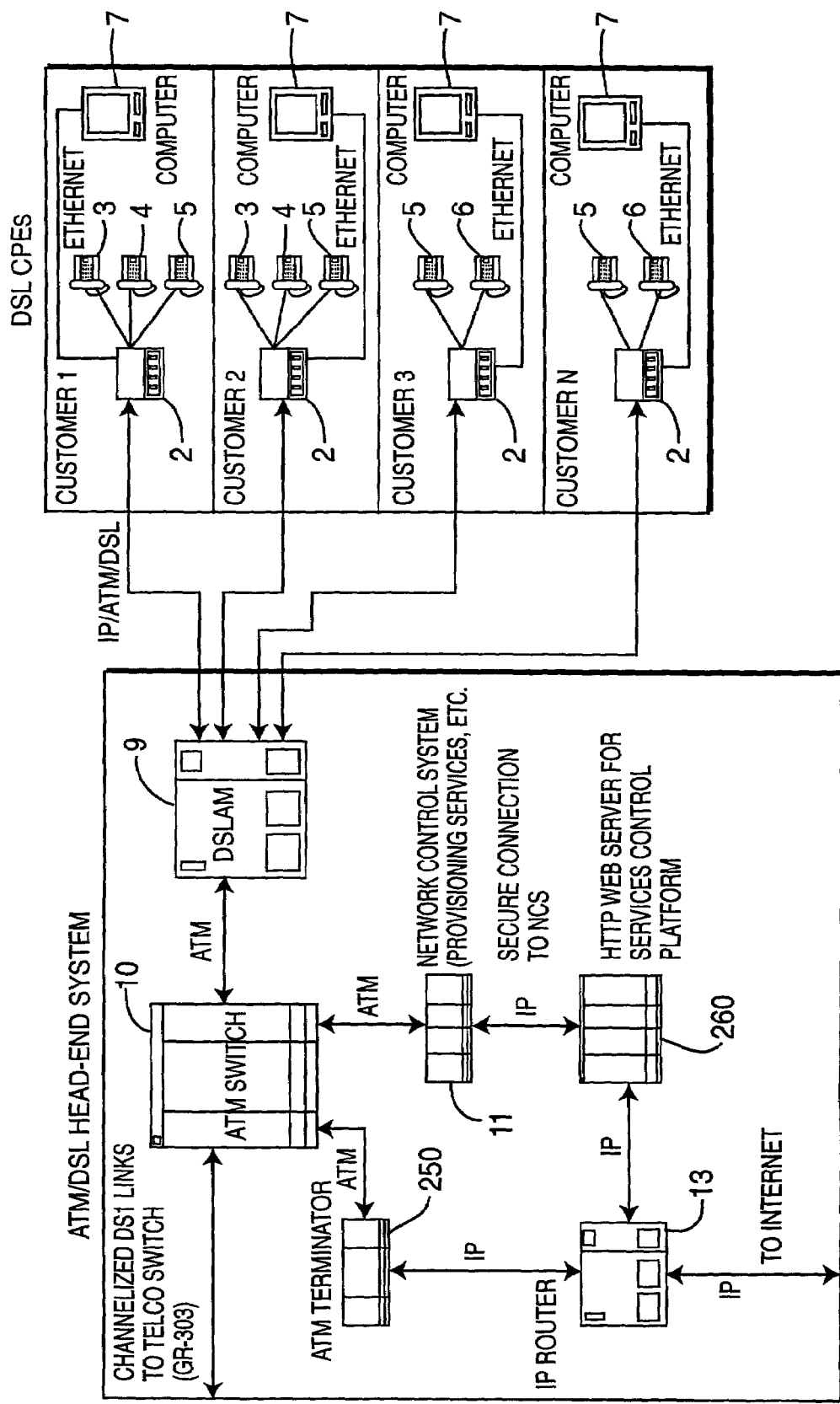
FIG. 2 is a diagram of an exemplary system architecture with web server for services control platform, according to an illustrative embodiment of the present invention.

FIG. 2 is a diagram of an exemplary system architecture with web server for Services Control Platform, according to an illustrative embodiment of the present invention. The architecture can be considered to include two portions, the first portion comprising the ATM/DSL head-end system and the second portion comprising the DSL CPEs.

The ATM/DSL head-end system includes a DSLAM 9, an ATM switch 10, a network control system (NCS) 11, an IP router 13, an ATM terminator 12, and a Hypertext Transfer Protocol (HTTP) web server for services control platform 260.

The DSL CPEs include, for each of customers 1-N, a CPE unit 2, telephones (arbitrarily, telephones 3–5 for customers 1 and 2, telephones 5–6 for customers 3 and N), and a computer or desktop system 7.

The NCS 11 currently connects to the Internet through the ATM terminator 12. The ATM terminator 12 handles all data conversion from IP to ATM and from ATM to IP. When the CPE unit 2 transmits data, the ATM terminator 12 receives that ATM data from the ATM switch 10, removes the ATM wrapper around the IP data and forwards the data on to the ISP. When the ISP sends data to the ATM terminator 12, the ATM terminator 12 receives the IP data, wraps that IP data in ATM and sends it on to the ATM switch 10. The ATM terminator 12 will identify the Internet traffic and assign the proper virtual path identifier/virtual channel identifier (VPI/VCI) so that the data will be routed to the proper destination CPE unit 2. As an example, the ATM terminator 12 could have two 10/100BaseT ports for use to connect to an ISP. Depending on the ISP chosen, this configuration may be fine or another configuration may need to be chosen.

The HTTP web server for services control platform 260 handles all transactions between the customer's application at or behind the CPE unit 2 and the NCS customer access and configuration services. The HTTP web server for services control platform 260 provides a simple user interface through the use of HTML web pages for the customer to configure their services, control specific options, and obtain information relating to their service. An application will exist on the HTTP web server for services control platform 260 that will translate the information provided by the customer on the web page into specific queries or change requests directed towards the provisioning databases in the NCS. The customer's changes will need to be validated and this can be done through the use of the unique serial number embedded within each CPE unit 2. In the provisioning database, there is a relationship between the unique serial number of the customer's CPE unit 2, their provisioned services and information. Additional methods can also be used such as, for example, a password authentication system or other type of authentication system. Given the teachings of the present invention provided herein, one of ordinary skill in the related will contemplate various other authentication systems, all of which maintain the spirit and scope of the present invention.

Figure 3:
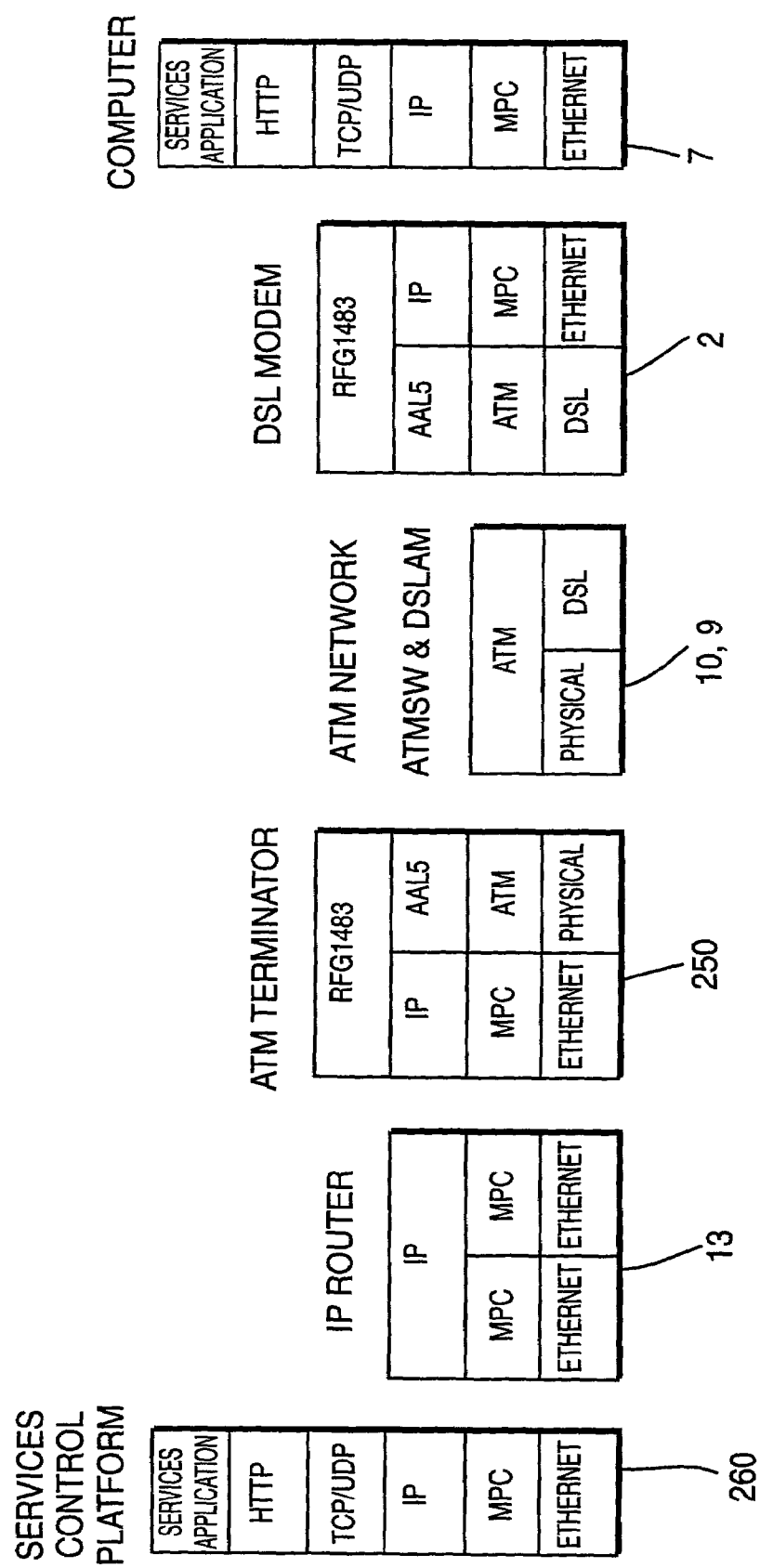
FIG. 3 is a diagram of a communication path between computer application and network control system (NCS) platform, according to an illustrative embodiment of the present invention.

FIG. 3 is a diagram of a communication path between a computer application and a network control system (NCS) platform, according to an illustrative embodiment of the present invention. The communication path is a secure data path as follows: from the computer 7 to the CPE unit 2; from the CPE unit 2 to the DSLAM 9; from the DSLAM 9 to the ATM switch 10; from the ATM switch 10 to the IP router 13; and from the IP router 13 to the HTTP web server for services control platform 260.

Figure 4:
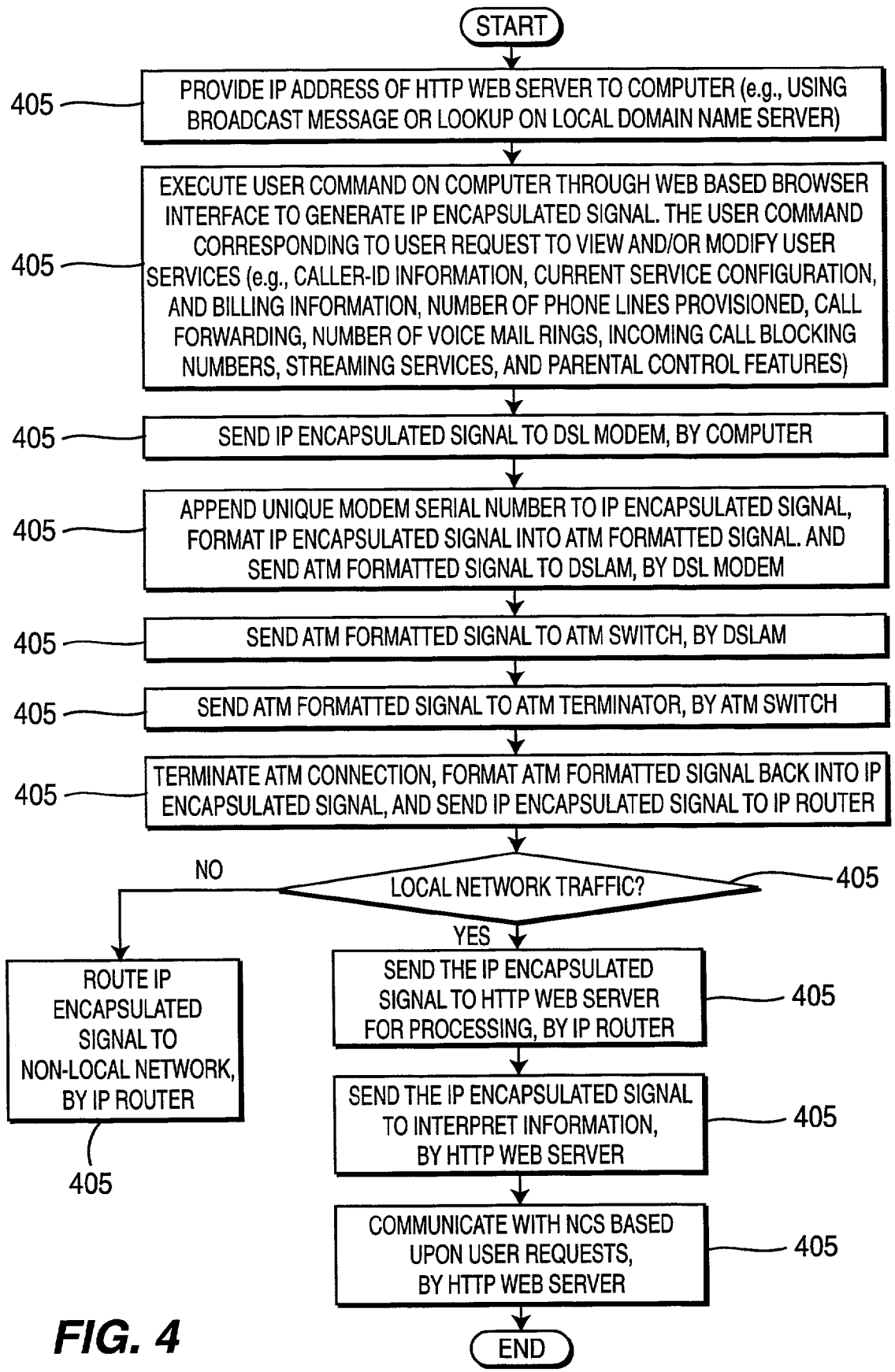
FIG. 4 is a flow diagram illustrating a method for remote services control in an Asynchronous Transfer Mode (ATM)/Digital Subscriber Line (DSL) service network, according to an illustrative embodiment of the present invention.
Figure 2:
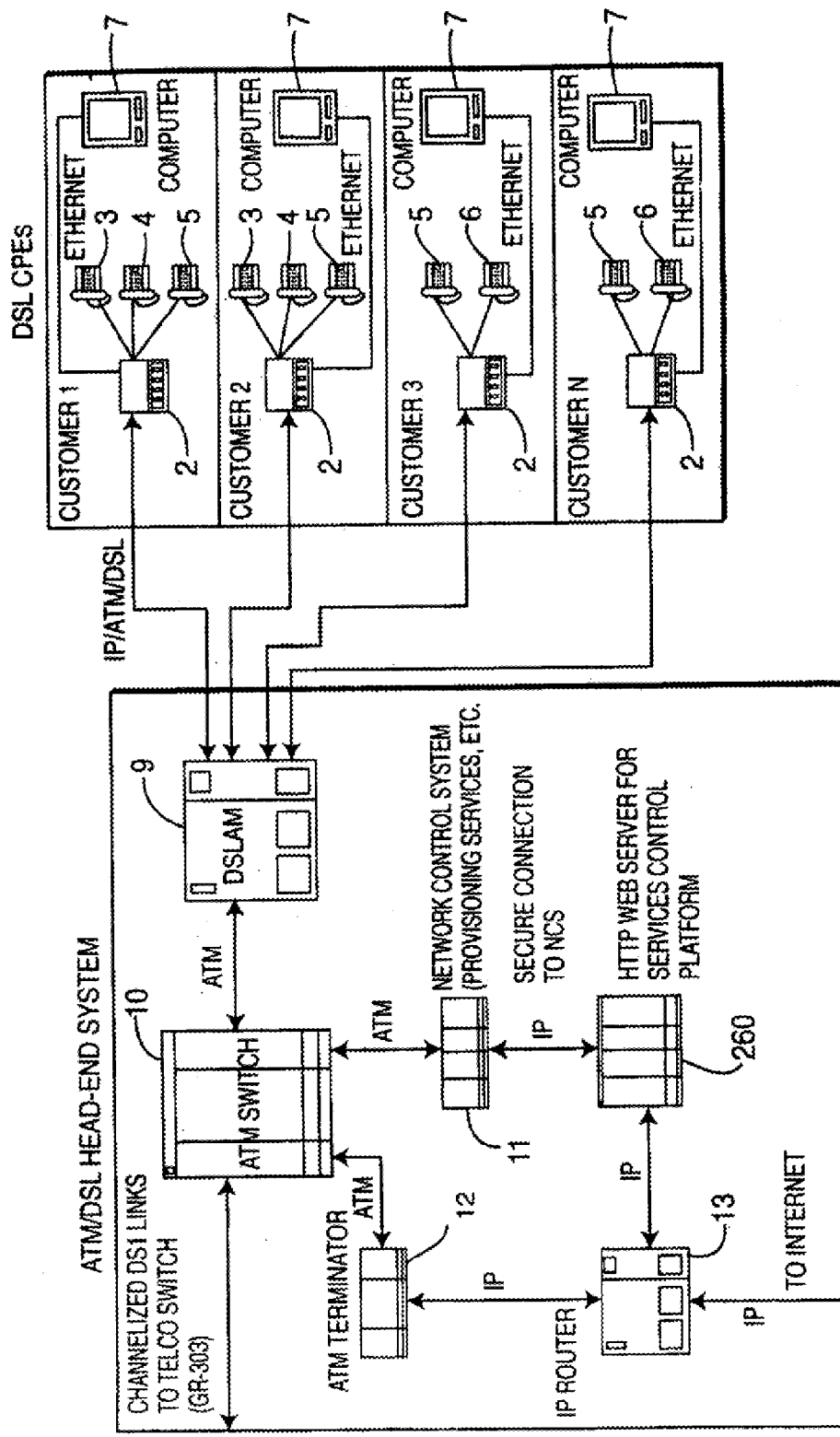
Figure 3:
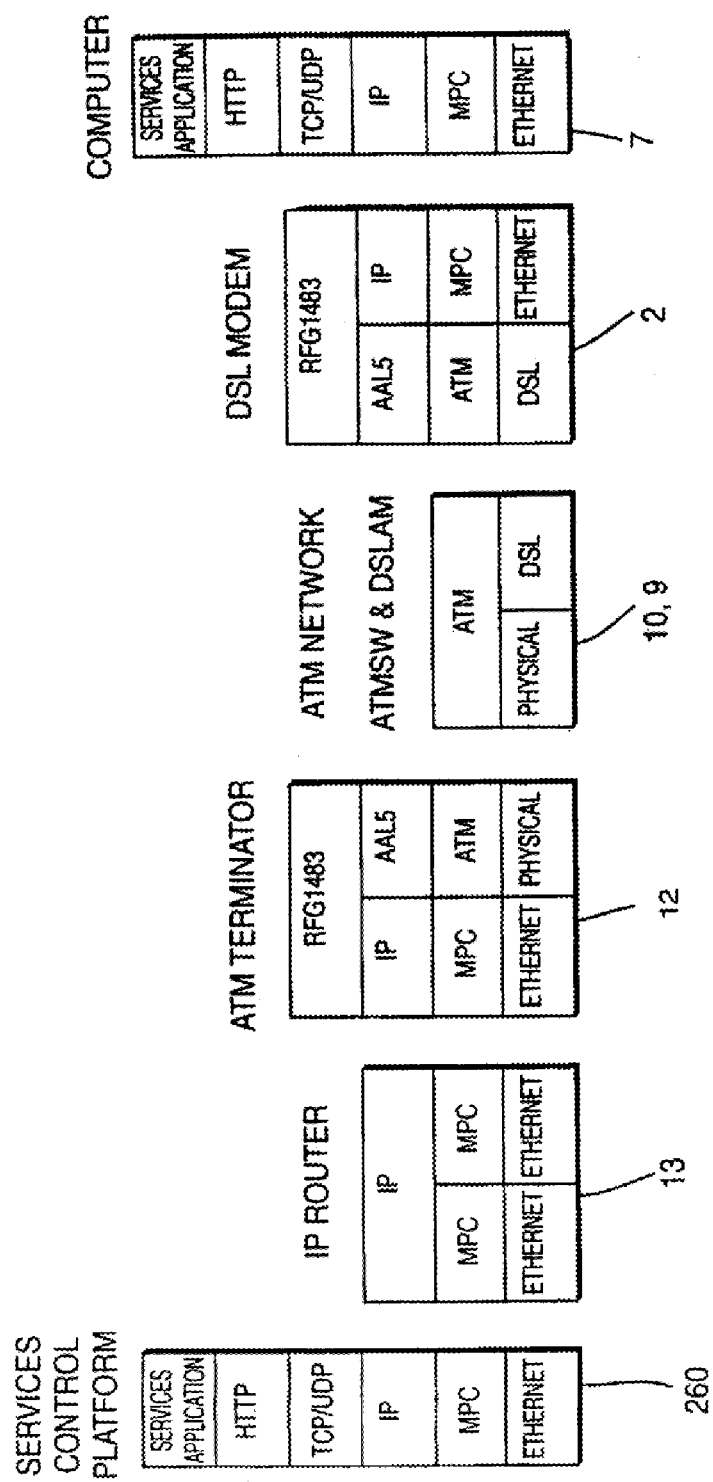
Figure 4:
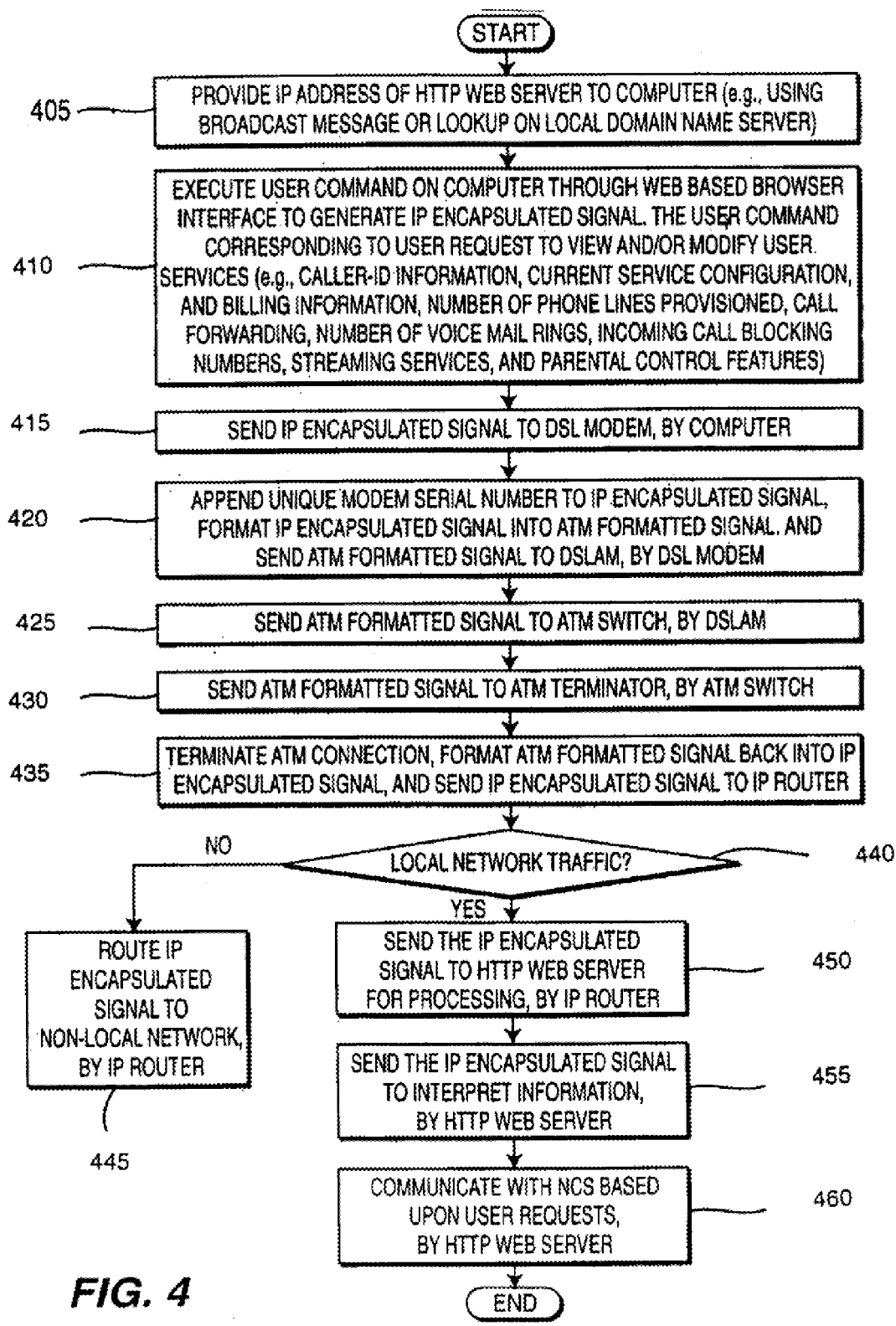

FIG. 4 is a flow diagram illustrating a method for remote services control in an Asynchronous Transfer Mode (ATM)/Digital Subscriber Line (DSL) service network, according to an illustrative embodiment of the present invention. The ATM/DSL service network includes Customer Premise Equipment and an ATM/DSL head-end network control system.

The HTTP web server for services control platform 260 will have an IP address that is local to the ATM/DSL head-end network. This IP address is provided to the computer 7 (step 405). Thus, an application on the computer 7 will have knowledge of the IP address to communicate with the HTTP web server for services control platform 260. The IP address of the HTTP web server 260 can be sent from the network control system 11 to the computer 7 through a broadcast message identifying itself or resolution can be made using a local domain name server and lookup the corresponding IP address based on a name query.

A user command is executed on the computer 7 through a web based browser interface to generate an IP encapsulated signal (step 410). The command corresponds to a user request to view and/or modify information pertaining to the services of the user (e.g., caller-ID information, current service configuration, and billing information, number of phone lines provisioned, call forwarding, number of voice mail rings, incoming call blocking numbers, streaming services, and parental control features).

The computer 7 then sends the IP encapsulated signal to the DSL modem in the CPE unit 2 (step 415). The DSL modem appends a unique serial number of the modem to the IP encapsulated signal, formats the IP encapsulated signal into an ATM formatted signal, and then sends the ATM formatted signal to the DSLAM 9 (step 420).

The DSLAM 9 sends the ATM formatted signal to the ATM switch 10 (step 425). The ATM switch 10 sends the ATM formatted signal to the ATM terminator 12 (step 430). The ATM terminator 12 terminates the ATM connection, formats the ATM formatted signal back into the IP encapsulated signal, and then sends the IP encapsulated signal to the IP router 13 (step 435).

The IP router 13 determines whether or not the IP encapsulated signal is local network traffic (step 440). If the IP encapsulated signal is not local network traffic, then the IP encapsulated signal is routed to the appropriate non-local network (step 445). However, if the IP encapsulated signal is local network traffic, then the IP router 13 sends the IP encapsulated signal to the HTTP web server for services control platform 260 for processing (step 450). The HTTP web server for services control platform 260 will examine the IP packet to interpret the information (step 455). The HTTP web server for services control platform 260 will communicate with the network control system 11 based upon the user requests (step 460).

It is to be appreciated that the user requests may correspond to the viewing of information or the changing of information pertaining to the services of the user. For example, the user requests could correspond to the viewing of certain information such as caller-ID information, current service configuration, and billing information. Moreover, the user requests could correspond to the changing of information such as the number of phone lines provisioned, activation/deactivation of call forwarding, the number of voice mail rings required until message recording is commenced, adding/deleting incoming call blocking numbers, adding/deleting streaming services, and adding/deleting parental control features (e.g., times allowed for the phone line to be active and outgoing call blocking numbers). The preceding list of items to which requests could correspond are merely illustrative and, thus, requests for other items may be made which maintain the spirit and scope of the present invention. Thus, the invention advantageously provides the capability of being able to interact with the network control system 11 securely to provide feedback on usage as well as feature control on an individual basis.

Although the illustrative embodiments have been described herein with reference to the accompanying drawings, it is to be understood that the present system and method is not limited to those precise embodiments, and that various other changes and modifications may be affected therein by one skilled in the art without departing from the scope or spirit of the invention. All such changes and modifications are intended to be included within the scope of the invention as defined by the appended claims.

What is claimed is:

1. A method for remote services control in an Asynchronous Transfer Mode (ATM)/Digital Subscriber Line (DSL) service network, the ATM/DSL service network including an ATM/DSL head-end system (NCS) and Customer Premise Equipment (CPE), the ATM/DSL head-end system including a network control system (NCS), the CPE including at least one computer, said method comprising the steps of:

sending an Internet Protocol (IP) encapsulated signal from the at least one computer, in response to an execution of a user command for the remote services control on the at least one computer, the IP encapsulated signal including an IP address of a Hypertext Transfer Protocol (HTTP) web server that is coupled to the NCS;

receiving the IP encapsulated signal for processing by the HTTP server; and communicating the user command to the NCS, by the HTTP web server;

validating a corresponding control change to a remote service as specified in the user command, by at least the HTTP web server, based upon a relationship between a user that issued the user command, the remote services provisioned for the user, and a unique serial number of a CPE corresponding to the user.

2. The method according to claim 1, further comprising the step of providing a web based browser interface on the at least one computer to execute user commands with respect to the remote services control.

3. The method according to claim 1, wherein the IP address is local to the ATM/DSL head-end system.

4. The method according to claim 1, further comprising the step of providing an application program on the HTTP server for a user to log into to validate the corresponding control change to the remote service as specified in the user command.

5. The method according to claim 1, wherein the CPE further includes at least one CPE unit having a DSL modem therein, and said method further comprises the steps of:

appending a unique modem serial number to the IP encapsulated signal, prior to said receiving step; and providing an application program on the HTTP server for a user to log into to validate the corresponding control change to the remote service as specified in the user command based on the unique modem serial number.

6. The method according to claim 1, further comprising the step of modifying services configurations of the ATM/DSL service network by the NCS, based upon the user command communicated to the NCS by the HTTP web server.

7. The method according to claim 1, further comprising the step of broadcasting the IP address of the HTTP web server to the at least one computer, prior to said sending step.

8. The method according to claim 1, wherein the ATM/DSL service network further comprises a local domain name server, and said method further comprises the step of looking up the IP address on the local domain name server by the computer, prior to said sending step.

9. The method according to claim 1, wherein the remote services control comprise at least one of a viewing and an alteration of information pertaining to services of a particular user.

10. The method according to claim 9, wherein the information pertaining to the services of the particular user comprises at least one of call-id information, current service configuration information, and billing information.

11. The method according to claim 9, wherein the information pertaining to the services of the particular user comprises at least one of a number of phone lines provisioned for the user, call forwarding information, voice mail rings information, incoming call blocking numbers, and parental control features.

12. The method according to claim 11, wherein the parental control features comprise at least one of outgoing call blocking numbers and times during which at least one phone line pertaining to the user is active.

13. A method for remote services control in an Asynchronous Transfer Mode (ATM)/Digital Subscriber Line (DSL) service network, the ATM/DSL service network including an ATM/DSL head-end system (NCS) and Customer Premise Equipment (CPE), the ATM/DSL head-end system including a network control system (NCS), the CPE including at least one computer and a DSL modem IP interface, the at least one computer having a web based browser interface thereon, said method comprising the steps of:

provide a Hypertext Transfer Protocol (HTTP) web server coupled to the NCS for communication there between; and communicating with the NCS using the HTTP web server, the DSL modem IP interface, and the web based browser interface, by the at least one computer, with respect to the remote services control, said communicating step including the steps of:

formatting an IP encapsulated signal from the at least one computer into an ATM formatted signal, the IP encapsulated signal including a user command relating to the remote services control;

formatting the ATM formatted signal back into the IP encapsulated signal for processing by the HTTP web server;

validating a corresponding control change to a remote service as specified in the user command, by at least the HTTP web server, based upon a relationship between a user that issued the user command, the remote services provisioned for the user, and a unique serial number of a CPE corresponding to the user.

14. The method according to claim 13, further comprising the steps of:

identifying the at least one computer using a unique modem serial number; and identifying the HTTP web server using a local IP address.

15. A method for remote services control in an Asynchronous Transfer Mode (ATM)/Digital Subscriber Line (DSL) service network, the ATM/DSL service network including an ATMJDSL head-end system (NCS) and Customer Premise Equipment (CPE), the ATM/DSL head-end system including a digital subscriber line access multiplexer (DSLAM), an ATM switch, an ATM terminator, an ATM router, and a network control system (NCS), the CPE including at least one computer having a web based browser interface thereon and at least one CPE unit, the at least one CPE unit having a DSL modem therein, said method comprising the steps of:

sending an Internet Protocol (IP) encapsulated signal from the at least one computer to the DSL modem, in response to an execution of a user command for the remote services control on the at least one computer through the web based browser interface;

appending a unique modem serial number to the IP encapsulated signal, formatting the IP encapsulated signal into an ATM formatted signal, and sending the ATM formatted signal to the DSLAM, by the DSL modem;

sending the ATM formatted signal to the ATM switch from the DSLAM;

sending the ATM formatted signal to the ATM terminator from the ATM switch;

formatting the ATM formatted signal back into the. IP encapsulated signal, and sending the IP encapsulated signal to the IP router, by the ATM terminator;

determining whether the IP encapsulated signal is local network traffic, by the IP router;

sending the IP encapsulated signal to a Hypertext Transfer Protocol (HTTP) web server for processing when the IP encapsulated signal is the local network traffic, by the IP router;

validating a corresponding control change to a remote service as specified in the user command, by at least the HTTP web server, based upon a relationship between a user that issued the user command, the remote services provisioned for the user, and a unique serial number of a CPE corresponding to the user; and communicating the user command to the NCS, by the HTTP web server.

* * * * *

UNITED STATES PATENT AND TRADEMARK OFFICE
CERTIFICATE OF CORRECTION

PATENT NO. : 7,054,915 B2
APPLICATION NO. : 09/893912
DATED : May 30, 2006
INVENTOR(S) : John William Richardson and Kumar Ramaswamy It is certified that error appears in the above-identified patent and that said Letters Patent is hereby corrected as shown below:

As shown in the replacement drawings:

In drawing Figure 2, please delete "250" and insert therefor --12--.

In drawing Figure 3, please delete "250" and insert therefor --12--.

In drawing Figure 4, please delete the second instance of "405" and insert therefor --410--.

In drawing Figure 4, please delete the third instance of "405" and insert therefor --415--.

In drawing Figure 4, please delete the fourth instance of "405" and insert therefor --420--.

In drawing Figure 4, please delete the fifth instance of "405" and insert therefor --425--.

In drawing Figure 4, please delete the sixth instance of "405" and insert therefor --430--.

In drawing Figure 4, please delete the seventh instance of "405" and insert therefor --435--.

In drawing Figure 4, please delete the eighth instance of "405" and insert therefor --440--.

In drawing Figure 4, please delete the ninth instance of "405" and insert therefor --445--.

In drawing Figure 4, please delete the tenth instance of "405" and insert therefor --450--.

UNITED STATES PATENT AND TRADEMARK OFFICE
CERTIFICATE OF CORRECTION

PATENT NO. : 7,054,915 B2
APPLICATION NO. : 09/893912
DATED : May 30, 2006
INVENTOR(S) : John William Richardson and Kumar Ramaswamy It is certified that error appears in the above-identified patent and that said Letters Patent is hereby corrected as shown below:

In drawing Figure 4, please delete the eleventh instance of "405" and insert therefor --455--.

In drawing Figure 4, please delete the twelfth instance of "405" and insert therefor --460--.

In column 6, line 48, please delete "ATMJDSL" and insert therefor --ATM/DSL--.

Signed and Sealed this

Twenty-fifth Day of March, 2008

JON W. DUDAS
*Director of the United States Patent and Trademark Office*